(12) United States Patent
Matsuo et al.

US010003077B2

(10) Patent No.: US 10,003,077 B2
(45) Date of Patent: Jun. 19, 2018

(54) BATTERY ELECTRODE BINDER AND BATTERY AND ELECTRODE USING SAME

(71) Applicant: OSAKA SODA CO., LTD., Osaka (JP)

(72) Inventors: Takashi Matsuo, Osaka (JP); Tomoyuki Yano, Osaka (JP); Yasushi Miki, Osaka (JP); Katsuhito Miura, Osaka (JP)

(73) Assignee: OSAKA SODA CO., LTD., Osaka (JP)

( * ) Notice: Subject to any disclaimer, the term of this patent is extended or adjusted under 35 U.S.C. 154(b) by 0 days. days.

(21) Appl. No.: 15/032,693

(22) PCT Filed: Oct. 28, 2014

(86) PCT No.: PCT/JP2014/078629
§ 371 (c)(1),
(2) Date: Apr. 28, 2016

(87) PCT Pub. No.: WO2015/064570
PCT Pub. Date: May 7, 2015

(65) Prior Publication Data
US 2016/0260976 A1 Sep. 8, 2016

(30) Foreign Application Priority Data

Oct. 29, 2013 (JP) .................................. 2013-224291

(51) Int. Cl.
*H01M 4/62* (2006.01)
*H01G 11/38* (2013.01)
*H01M 4/131* (2010.01)
*C08F 220/28* (2006.01)
*C09J 133/12* (2006.01)
*C09J 133/14* (2006.01)
*H01M 2/16* (2006.01)
*H01M 4/38* (2006.01)
*H01M 4/66* (2006.01)
*H01M 10/0525* (2010.01)
*H01M 10/0568* (2010.01)
*H01M 10/0569* (2010.01)
*H01M 10/0585* (2010.01)
*H01M 10/052* (2010.01)
*H01M 4/04* (2006.01)
*H01M 4/1391* (2010.01)
*H01M 4/02* (2006.01)

(52) U.S. Cl.
CPC ........... *H01M 4/622* (2013.01); *C08F 220/28* (2013.01); *C09J 133/12* (2013.01); *C09J 133/14* (2013.01); *H01G 11/38* (2013.01); *H01M 2/1653* (2013.01); *H01M 2/1686* (2013.01); *H01M 4/131* (2013.01); *H01M 4/382* (2013.01); *H01M 4/625* (2013.01); *H01M 4/661* (2013.01); *H01M 10/0525* (2013.01); *H01M 10/0568* (2013.01); *H01M 10/0569* (2013.01); *H01M 10/0585* (2013.01); *H01M 4/0404* (2013.01); *H01M 4/0435* (2013.01); *H01M 4/0471* (2013.01); *H01M 4/1391* (2013.01); *H01M 10/052* (2013.01); *H01M 2004/021* (2013.01); *H01M 2004/027* (2013.01); *H01M 2004/028* (2013.01); *H01M 2300/0037* (2013.01); *Y02E 60/13* (2013.01); *Y02T 10/7022* (2013.01)

(58) Field of Classification Search
CPC ............................. H01M 4/622; C09J 133/14
See application file for complete search history.

(56) References Cited

U.S. PATENT DOCUMENTS

| | | | |
|---|---|---|---|
| 3,996,394 | A | 12/1976 | Harris |
| 2002/0122985 | A1 | 9/2002 | Sato et al. |
| 2007/0099814 | A1 | 5/2007 | Tamori et al. |
| 2007/0172667 | A1 | 7/2007 | Sato et al. |
| 2015/0137030 | A1 | 5/2015 | Matsuo et al. |
| 2015/0372305 | A1 | 12/2015 | Matsuo et al. |

FOREIGN PATENT DOCUMENTS

| | | |
|---|---|---|
| EP | 1 780 544 | 5/2007 |
| EP | 3 116 054 | 1/2017 |
| JP | 4-270774 | 9/1992 |
| JP | 11-25989 | 1/1999 |
| JP | 2001-256980 | 9/2001 |
| JP | 2002-289174 | 10/2002 |
| JP | 2003-268053 | 9/2003 |
| JP | 2006-66400 | 3/2006 |

(Continued)

OTHER PUBLICATIONS

English machine translation of Wakizaka et al. Intl. Pub. No. WO 2011/148970A1 (2011).*
International Preliminary Report on Patentability dated May 3, 2016 in International Application No. PCT/JP2014/078629.
International Search Report dated Jan. 13, 2015 in International Application No. PCT/JP2014/078629.

(Continued)

*Primary Examiner* — Peter F Godenschwager
(74) *Attorney, Agent, or Firm* — Wenderoth, Lind & Ponack, L.L.P.

(57) ABSTRACT

Disclosed is a battery electrode binder containing a polymer including (1) a constituent unit derived from a (meth) acrylate monomer (A) having a hydroxyl group, (2) a constituent unit derived from a vinyl ester monomer (B), and (3) a constituent unit derived from a polyfunctional (meth) acrylate monomer (C). Using the binder, an electrode is produced and adopted in a battery such as a lithium ion secondary battery. Obtained are: an aqueous binder that has a low environmental impact, has high adhesiveness, and in particular does not cause oxidative degradation in the electrode environment; and a battery and electrode using the binder.

12 Claims, No Drawings

(56) References Cited

FOREIGN PATENT DOCUMENTS

| JP | 2006-260782 | 9/2006 |
|----|-------------|--------|
| JP | 2012-51999 | 3/2012 |
| WO | 2011/148970 | 12/2011 |
| WO | 2013/180103 | 12/2013 |
| WO | 2014/119481 | 8/2014 |

OTHER PUBLICATIONS

Extended European Search Report dated Mar. 8, 2017 in corresponding European Application No. 14858247.1.
European office Action dated Mar. 1, 2018 in corresponding European Patent Application No. 14858247.1.

\* cited by examiner

BATTERY ELECTRODE BINDER AND BATTERY AND ELECTRODE USING SAME

TECHNICAL FIELD

The present invention relates to a binder used for an electrode of battery, the electrode manufactured by using said binder, and a battery manufactured by using said electrode. Herein, the battery includes an electrochemical capacitor and is a primary battery or a secondary battery. Examples of the battery are a lithium-ion secondary battery, and a nickel hydrogen secondary battery.

BACKGROUND ART

The use of a binder is known in an electrode of a battery. Representative examples of the battery having the electrode comprising the binder include a lithium-ion secondary battery.

Since the lithium-ion secondary battery has a high energy density and a high voltage, the lithium-ion secondary battery is used for electronic apparatuses, such as a mobile phone, a laptop computer and a camcorder. Recently, because of a rise of consciousness to environmental protection, and enactment of related laws, the application in vehicles, such as an electric vehicle and a hybrid electric vehicle, and the application of a storage battery in electric power storage for home are also progressing.

The lithium-ion secondary battery generally comprises a negative electrode, a positive electrode, a separator, a liquid electrolyte and an electrical collector. With respect to the electrodes, the negative electrode is obtained by applying a coating liquid which comprises a negative electrode active material, such as graphite and hard carbon capable of intercalating and deintercalating a lithium ion, an electrically conductive additive, a binder and a solvent onto an electrical collector represented by a copper foil, and drying the coating liquid. Recently, a dispersion comprising a styrene-butadiene rubber (abbreviated as "SBR" hereafter) dispersed in water is generally used as the binder.

On the other hand, the positive electrode is produced by mixing a positive electrode active material such as layered lithium cobaltate and spinel-type lithium manganate, an electrically conductive additive such as carbon black, and a binder such as polyvinylidene fluoride and polytetrafluoroethylene, dispersing them in a polar solvent such as N-methylpyrrolidone to prepare a coating liquid, then coating the coating liquid, as in the same manner as the negative electrode, on an electrical collector foil represented by aluminum foil, and drying the coating liquid.

These binders for lithium-ion batteries need to increase the addition amount of the binder, in order to secure the bondability, thereby causing the deterioration of the performances which is a problem of these binders. Since N-methylpyrrolidone is used for the slurry solvent, an aqueous binder is required from a viewpoint of a recovery, a cost, toxicity and an environmental load. However, the use of a SBR-base binder, which is an aqueous binder, has the problem that oxidative degradation is caused under a positive electrode environment. Therefore, the binders comprising polyvinylidene fluoride and/or polytetrafluoroethylene dispersed in N-methylpyrrolidone as a dispersing solvent are still used as the binder of the positive electrode. Urgently required is the development of the binder which is excellent in the bondability between the electrical collector and the active material, and between active materials, has a low environmental load, is an aqueous binder, and is suitable for manufacture of the electrode for secondary batteries having high oxidation resistance.

In order to solve the above-mentioned problems, Patent Documents 1 and 2 propose a binder comprising a copolymer which comprises an aromatic vinyl, a conjugated diene, an ethylenically unsaturated carboxylic acid ester and an unsaturated carboxylic acid (Patent Document 1), and a binder comprising an aqueous polymer dispersion selected from a styrene-butadiene polymer latex and an acrylic emulsion (Patent Document 2).

Further, Patent Documents 3 and 4 propose a binder comprising a copolymer which comprises an aromatic vinyl, a conjugated diene, a (meth)acrylate ester and an ethylenically unsaturated carboxylic acid (Patent Document 3), and a binder comprising a polymer which comprises a difunctional (meth)acrylate (Patent Document 4).

However, if these binders are used for an electrode (a positive electrode and/or negative electrode), a capacity after charge/discharge cycle is deteriorated under the conditions of high temperature. Particularly, if these binders are used for the positive electrode, there is the concern that a problem of oxidation resistance under conditions of high voltage is caused to deteriorate the battery properties.

PRIOR ARTS DOCUMENTS

Patent Documents

Patent Document 1: JP 2006-66400A
Patent Document 2: JP 2006-260782A
Patent Document 3: JP H11-025989A
Patent Document 4: JP 2001-256980A

SUMMARY OF THE INVENTION

Problems to be Solved by the Invention

The present invention has been made in view of the above circumstances. An object of the present invention is to provide a water-based binder having a better coatability of an electrode slurry, a high bondability, no oxidative degradation in an electrode environment (particularly under a positive-electrode environment), and a small environmental load, and to provide an electrode and a battery comprising the water-based binder.

Means for Solving the Problems

The present inventors discovered, as a result of extensive studies in order to achieve the above object, that the use of a binder comprising a polymer comprising structural units derived from a hydroxyl group-containing (meth)acrylic monomer, structural units derived from a vinyl ester monomer, and structural units derived from a multi-functional (meth)acrylate monomer can solve the above problems, to complete the present invention. That is, the present invention relates to the followings.

[1]
A battery electrode binder comprising a polymer comprising:
(I) structural units derived from a hydroxyl group-containing (meth)acrylate monomer (A), and
(II) structural units derived from a vinyl ester monomer (B) represented by the general formula (1):

[Chemical Formula 1]

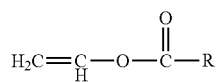

wherein R is a hydrocarbon group having 1 to 18 carbon atoms, and
(III) structural units derived from a polyfunctional (meth)acrylate monomer (C).

[2]
The battery electrode binder according to [1], wherein the hydroxyl group-containing (meth)acrylate monomer (A) is an alkylene glycol mono(meth)acrylate having a molecular weight of 100 to 1000.

[3]
The battery electrode binder according to [1] or [2], wherein the hydroxyl group-containing (meth)acrylate monomer (A) is a compound represented by the general formula:

[Chemical Formula 2]

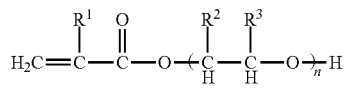

wherein $R^1$ is hydrogen or a linear or branched alkyl group having 1 to 4 carbon atoms, $R^2$ and $R^3$ each is hydrogen or a linear or branched alkyl group having 1 to 4 carbon atoms, and
n is an integer of 1-30.

[4]
The battery electrode binder according to any one of [1] to [3], wherein the polyfunctional (meth)acrylate monomer (C) is di- to penta-functional (meth)acrylates.

[5]
The battery electrode binder according to any one of [1] to [4], wherein the polyfunctional (meth)acrylate monomer (C) is a compound represented by the formula:

[Chemical Formula 3]

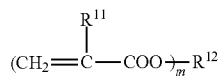

wherein, $R^{11}$ each is, the same or different, hydrogen or a methyl group,
$R^{12}$ is a penta- or less valent organic group having 2 to 100 carbon atoms, and
m is an integer of 5 or less.

[6]
The battery electrode binder according to any one of [1] to [5], wherein the polymer further comprises structural units derived from at least one acrylic monomer (D) selected from the group consisting of a (meth)acrylic acid monomer and a (meth)acrylate ester monomer.

[7]
The battery electrode binder according to [6], wherein the (meth)acrylic acid monomer is a compound represented by the formula:

[Chemical Formula 4]

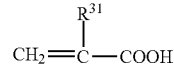

wherein $R^{31}$ is hydrogen or a methyl group, and
the (meth)acrylate ester monomer is a compound represented by the formula:

[Chemical Formula 5]

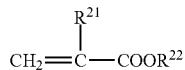

wherein $R^{21}$ is hydrogen or a methyl group, and
$R^{22}$ is a hydrocarbon group having 1 to 50 carbon atoms.

[8]
The battery electrode binder according to any one of [1] to [7], wherein the amounts of the structural units derived from the hydroxyl group-containing monomers (A), the structural units derived from the organic acid vinyl ester monomer (B), the structural units derived from the polyfunctional (meth)acrylate (C), and the structural units derived from the (meth)acrylic monomer (D) are (A) 10-90 wt %, (B) 5-70 wt %, (C) 0.1-50 wt % and (D) 0-70 wt %, based on the polymer.

[9]
The battery electrode binder according to any one of [1] to [8], wherein a battery is a secondary battery.

[10]
A battery electrode comprising the binder according to any one of [1] to [9], and an active material.

[11]
A battery comprising the battery electrode according to [10].

Effects of the Invention

The binder of the present invention is excellent in bondability to an active material, a conductive additive and a collector (an electrical collector). The excellent bondability (strong binding property) is considered to be caused by a large surface area possessed by fine particles of the polymer dispersed in water and a use of the structural units derived from the hydroxyl group-containing monomer.

The binder of the present invention provides an electrode having excellent flexibility.

The binder of the present invention, having suppressed dissolution of the electrolyte, is substantially insoluble in electrolyte. The insolubleness is considered to be caused by a highly cross-linked structure by using structural units derived from the polyfunctional (meth)acrylate monomer as a crosslinking component.

The present invention provides a battery having a high capacity and a longer battery life, in particular a secondary battery. The secondary battery is excellent in charge-discharge cycle characteristics. In particular, the secondary battery has a long cycle life and an excellent cycle charge-discharge property at a high temperature (eg., 60° C.).

The secondary battery of the present invention can be used at a high voltage, and has excellent heat resistance.

Because the binder is water-based (a medium is water), the binder has a less burden on the environment and does not require a system of recovering an organic solvent.

MODES FOR CARRYING OUT THE INVENTION

The binder of the present invention is preferably a battery electrode binder comprising a polymer comprising:
(I) structural units derived from a hydroxyl group-containing (meth)acrylate monomer (A), and
(II) structural units derived from a vinyl ester monomer (B) represented by the general formula (1):

[Chemical Formula 6]

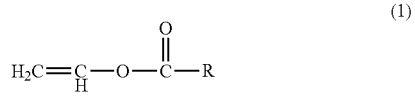

(1)

wherein R is a hydrocarbon group having 1 to 18 carbon atoms, and
(III) structural units derived from a polyfunctional (meth) acrylate monomer (C).

The structural units of the polymer according to the present invention will be explained in detail hereinafter.

The hydroxyl group-containing (meth)acrylate monomer (A) is preferably an alkylene glycol mono(meth)acrylate having a molecular weight (number-average molecular weight) of 100 to 1000 (for example, 150 to 1000).

The hydroxyl group-containing (meth)acrylate monomer (A) is a compound represented by the general formula:

[Chemical Formula 7]

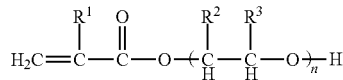

wherein $R^1$ is hydrogen or a linear or branched alkyl group having 1 to 4 carbon atoms, $R^2$ and $R^3$ each is hydrogen or a linear or branched alkyl group having 1 to 4 carbon atoms, and n is an integer of 1-30. n is an integer of 1-30, preferably n is an integer of 2-25, more preferably 4-20.

Specific examples of the hydroxyl group-containing (meth)acrylate monomer (A) include hydroxyethyl (meth) acrylate, diethylene glycol mono(meth)acrylate, triethylene glycol mono(meth)acrylate, tetraethylene glycol mono (meth)acrylate, polyethylene glycol mono(meth)acrylate, dipropylene glycol mono(meth)acrylate, tripropylene glycol mono(meth)acrylate, tetrapropylene glycol mono(meth) acrylate and polypropylene glycol mono(meth)acrylate. These can be used alone or in combination of at least two. Among these, preferable are tetraethylene glycol mono (meth)acrylate, polyethylene glycol mono(meth)acrylate, tetrapropylene glycol mono(meth)acrylate and polypropylene glycol mono(meth)acrylate.

In the general formula (I) of the vinyl ester monomer (B) (particularly, an organic acid vinyl ester monomer), R is a hydrocarbon group having 1 to 18 carbon atoms, in particular a linear or branched alkyl group. R has preferably 1 to 12 carbon atoms, more preferably 1 to 6 carbon atoms.

Specific examples of the vinyl ester monomers include vinyl acetate, vinyl propionate, vinyl butyrate, vinyl trimethyl acetate, vinyl caproate, vinyl caprylate, vinyl laurate, vinyl palmitate and vinyl stearate. These can be used alone or in combination. Among these, preferable are vinyl acetate and vinyl propionate.

The amount of the vinyl ester monomer may be from 1 to 700 parts by weight, for example, from 5 to 500 parts by weight, particularly from 10 to 400 parts by weight, based on (A) 100 parts by weight of the structural units of the hydroxyl group-containing (meth)acrylate monomer (A).

The polyfunctional (meth)acrylate monomer (C) acts as a crosslinking agent. The Polyfunctional (meth)acrylate monomer include di- to penta-functional (meth)acrylates. The di- to penta-functional cross-linking agent has good dispersion in emulsion polymerization, and excellent physical properties as a binder (flexibility and bondability). The polyfunctional (meth)acrylate monomer is preferably a tri-functional or tetra-functional (meth)acrylate.

Preferably, the polyfunctional (meth)acrylate monomer (C) is a compound represented by the formula:

[Chemical Formula 8]

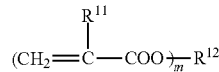

wherein, $R^{11}$ each is, the same or different, hydrogen or a methyl group,
$R^{12}$ is a penta- or less valent organic group having 2 to 100 carbon atoms, and
m is an integer of 5 or less.
Preferably, $R^{12}$ is a di- to penta-functional organic group, and m is an integer of 2-5. More preferably, $R^{12}$ is tri- to penta-functional, particularly tri to tetra-functional organic group, and m is an integer of 3-5, particularly an integer of 3-4.

$R^{12}$ may be a hydrocarbon group, an oxyalkylene group ($-(OA^1)$- where $A^1$ represents an alkylene group having 2 to 4 carbon atoms), a polyoxyalkylene group ($-(OA^2)_p$- where $A^2$ is an alkylene group having 2 to 4 carbon atoms, and p is 2 to 30), or combinations of at least two thereof. $R^{12}$ may have substituents. Examples of the substituent include a hydroxyl group, a carboxylic acid group, a nitrile group, a fluorine atom, an amino group, a sulfonic acid group, phosphoric acid group, an amide group, an isocyanuric acid group, oxyalkylene group ($-(OA^3)$-H where $A^3$ is an alkylene group having 2 to 4 carbon atoms), a polyoxyalkylene group. ($-(OA^4)_q$-H where $A^4$ is an alkylene group having 2 to 4 carbon atoms, and q is 2 to 30), an alkoxy oxyalkylene group (-($A^5$-O)—$B^1$ where $A^5$ is an alkylene group having 2 to 4 carbon atoms, and $B^1$ is an alkyl group having 1 to 4 carbon atoms), and an alkoxy polyoxyalkylene group (-($A^6$-O)$_r$—$B^2$ where $A^6$ is an alkylene group having 2 to 4 carbon atoms, r is 1 to 30, and $B^2$ is an alkyl group having 1 to 4 carbon atoms).

In $R^{12}$, the hydrocarbon group may be a linear or branched hydrocarbon group, preferably a branched hydrocarbon group. The number of carbon atoms in the hydrocarbon group is 2 to 100, for example 3 to 50, particularly 4 to 30.

Specific examples of the difunctional (meth)acrylate include triethylene glycol di(meth)acrylate, tetraethylene glycol di(meth)acrylate, polyethylene glycol di(meth)acrylate, tripropylene glycol di(meth)acrylate, tetrapropylene glycol di(meth)acrylate, polypropylene glycol di(meth)acrylate, polytetramethylene glycol di(meth)acrylate, dioxane glycol di(meth)acrylate and bis(meth)acryloyloxyethyl phosphate.

Specific examples of the trifunctional (meth)acrylate monomers include trimethylolpropane tri(meth)acrylate, trimethylolpropane EO-modified tri(meth)acrylate, trimethylolpropane PO-modified tri(meth)acrylate, pentaerythritol tri(meth)acrylate, 2,2,2-tris(meth)acryloyloxyethyl methyl ethyl succinate, ethoxylated isocyanuric acid tri(meth)acrylate, ε-caprolactone-modified tris-(2-(meth)acryloxy ethyl) isocyanurate, glycerol EO-modified tri(meth)acrylate, glycerol PO-modified tri(meth)acrylate and tris(meth)acryloyloxyethyl phosphate. Among these, preferable are trimethylolpropane tri(meth)acrylate, trimethylolpropane EO-modified tri(meth)acrylate and pentaerythritol tri(meth)acrylate.

Specific examples of tetrafunctional (meth)acrylate monomer include ditrimethylolpropane tetra(meth)acrylate, pentaerythritol tetra(meth)acrylate and pentaerythritol EO-modified tetra(meth)acrylate.

Specific examples of the pentafunctional (meth)acrylate monomer include dipentaerythritol penta(meth)acrylate.

The polyfunctional (meth)acrylate monomer can be used alone or in combination of at least two.

In the present invention, each of the monomers (A) to (D) can be used alone or in combination of at least two.

The amount of the structural units of the polyfunctional (meth)acrylate monomer (C) is 0.1 to 100 parts by weight, for example, 0.5 to 80 parts by weight, particularly 1 to 70 parts by weight, based on 100 parts by weight of the structural units of the hydroxyl group-containing (meth)acrylate monomer (A).

The polymer according to the present invention may comprise:
(4) structural units derived from at least one acrylic monomer (D) selected from the group consisting of a (meth)acrylic acid monomer and a (meth)acrylate ester monomer, in addition to:
(1) structural units derived from the hydroxyl group-containing (meth)acrylate monomer (A), and
(2) structural units derived from the vinyl ester monomer (B) represented by the general formula (1), and
(3) structural units derived from the polyfunctional (meth)acrylate monomer (C).

That is, the polymer according to the present invention may have the following configuration units.
Structural units (A)+(B)+(C), or
Structural units (A)+(B)+(C)+(D).

The acrylic monomer (D) is at least one monomer selected from the group consisting of the (meth)acrylic acid monomer and the (meth)acrylic acid ester monomer.

Preferably, the (meth)acrylic acid monomer is a compound represented by the formula:

[Chemical Formula 9]

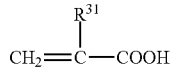

wherein $R^{31}$ is hydrogen or a methyl group.

Specific examples of the acrylic acid monomer include methacrylic acid and acrylic acid. The acrylic acid monomer may be used alone or in combination of at least two. A combination of methacrylic acid and acrylic acid may be used in a weight ratio of 1:99 to 99:1, for example 5:95 to 95:5, particularly 20:80 to 80:20.

Preferably, the (meth)acrylate ester monomer is a compound represented by the formula:

[Chemical Formula 10]

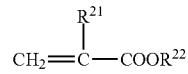

wherein $R^{21}$ is hydrogen or a methyl group, and
$R^{22}$ is a hydrocarbon group having 1 to 50 carbon atoms.

$R^{22}$ is a monovalent organic group, and may be a saturated or unsaturated aliphatic group (for example, a chain aliphatic group, or a cyclic aliphatic group), an aromatic group or an araliphatic group. $R^{22}$ is preferably a saturated hydrocarbon group, particularly a saturated aliphatic group. Particularly, the $R^{22}$ group is preferably a branched or linear alkyl group. The number of carbon atoms in $R^{22}$ is 1-50, for example, 1-30, particularly 1-20.

Specific examples of the (meth)acrylate ester monomer include alkyl acrylate esters, such as methyl (meth)acrylate, ethyl (meth)acrylate, propyl (meth)acrylate, isopropyl (meth)acrylate, n-butyl (meth)acrylate, isobutyl (meth)acrylate n-amyl (meth)acrylate, isoamyl (meth)acrylate n-hexyl (meth)acrylate, 2-ethylhexyl (meth)acrylate and dodecyl (meth)acrylate. Preferable are methyl (meth)acrylate, ethyl (meth)acrylate, propyl (meth)acrylate and isopropyl (meth)acrylate. The (meth)acrylate ester monomer may be used alone or in combination of at least two.

Another monomer other than the monomers (A), (B), (C) and (D), for example, a vinyl monomer may be further used. Examples of the vinyl monomer include monomers which are a gas at standard conditions, such as ethylene, propylene and vinyl chloride, and monomers which are a liquid or solid at standard conditions, particularly, (meth)acrylic monomers other than the monomers (A), (B), and (C) and (D), such as a (meth)acrylic monomer having a substituent which may be a hydroxyl group, an amide group, a fluorine atom or a sulfonic acid group. Preferably, in the present invention, the used monomers (i.e., monomers (A), (B), (C) and (D) as well as other monomers) do not have a carbon-carbon double bond including an aromatic carbon-carbon double bond (a carbon-carbon triple bond), in addition to the ethylenically unsaturated double bonds contained in the (meth)acrylic group.

The amounts of the structural units derived from the hydroxyl group-containing monomers (A), the structural units derived from the vinyl ester monomer (B), the structural units derived from the polyfunctional (meth)acrylate (C), and the structural units derived from the (meth)acrylic monomer (D) may be (A) 10-90 wt %, (B) 5-70 wt %, (C) 0.1-50 wt % and (D) 0-70 wt %, preferably (A) 15-80 wt %, (B) 8-60 wt %, (C) 0.5-40 wt % and (D) 1-60% by weight, more preferably (A) 20-70 wt %, (B) 10-55 wt %, (C) 1-30 wt % and (D) 2-50 wt %, based on the polymer. The upper limit of the amount of structural units derived from an (meth)acrylic monomer (D) may be 40 wt %, for example, 30 wt %, particularly 20 wt %.

Alternatively, the amounts of the structural units derived from the hydroxyl group-containing monomers (A), the structural units derived from the vinyl ester monomer (B), the structural units derived from the polyfunctional (meth) acrylate (C), and the structural units derived from the (meth)acrylic monomer (D) may be:

the structural units (B) 1 to 700 parts by weight, for example, 5 to 500 parts by weight, particularly 10 to 400 parts by weight,
the structural units (C) 0.5 to 500 parts by weight, for example, from 0.5 to 80 parts by weight, particularly 1 to 70 parts by weight, and
the structural units (D) 0 to 500 parts by weight, preferably 0.1 to 300 parts by weight, for example, 0.5 to 200 parts by weight, particularly 1 to 70 parts by weight,
based on 100 parts by weight of the structural units (A).

In addition to the structural units derived from the (meth) acrylic monomer unit (D), it is possible to use, for example, fumaric acid, maleic acid, itaconic acid, citraconic acid, mesaconic acid, glutaconic acid, acrylonitrile, methacrylonitrile, α-chloro acrylonitrile, crotononitrile, α-ethyl acrylonitrile, α-cyanoacrylates, vinylidene cyanide, fumaronitrile and 2-methoxyethyl (meth)acrylate.

Examples of a method of obtaining the polymer of the present invention include a general emulsion polymerization method, a soap free emulsion polymerization method, a seed polymerization method, and a method of conducting a polymerization after swelling a monomer, etc. into seed particles. Specifically, in a closed container equipped with an agitator and a heating device, a composition comprising a monomer, an emulsifier, a polymerization initiator, water, and optionally a dispersing agent, a chain transfer agent and a pH adjuster is stirred at a room temperature under an inert gas atmosphere to emulsify the monomer in water. The emulsification method includes a stirring method, a shearing method and an ultrasonic wave method, and can use a stirring blade and a homogenizer. Subsequently, the initiation of the polymerization with stirring to raise the temperature can give a latex of a spherical-shaped polymer wherein the polymer is dispersed in water. Alternatively, it is possible to use a dispersion in an organic solvent such as N-methyl pyrrolidone, which is produced by using, for example, a dispersing agent, after the produced spherical-shaped polymer is isolated. Further, a monomer, an emulsifier, a dispersing agent, etc. are used again and dispersed in water to obtain a latex of the polymer. A method of adding the monomer at the polymerization include a one-package charge method, a method of dropping the monomer and a pre-emulsion dropping method, and these method may be used in combination of at least two.

The particle structure of the polymer in the binder of the present invention is not particularly limited. For example, the present invention can use a latex of the polymer comprising the complex polymer particles of core/shell structure produced by a seed polymerization. For example, a method described in "Chemistry of dispersion/emulsification system" (published by Kougaskutosho Co., Ltd.) can be used for the seed polymerization method. Specifically, this method is that the monomer, the polymerization initiator and the emulsifier are added into a system dispersing the seed particles produced by the above-mentioned method, and nuclear particles are grown, and the above-mentioned method may be repeated once or more.

In the seed polymerization, the particles comprising the polymer of the present invention or a conventionally known polymer may be used. Examples of the conventionally known polymer include polyethylene, polypropylene, polyvinyl alcohol, polystyrene, poly(meth)acrylate and polyether. The conventionally known polymer is not limited to the above-mentioned examples, and another conventionally known polymer can be used. A homopolymer, or a copolymer or a blend may be used.

Examples of a particle shape of the polymer in the binder of the present invention include a platelet structure, a hollow structure, a composite structure, a localized structure, a Daruma-shaped structure, an octopus-shaped structure and raspberry-shaped structure in addition to the spherical-shaped structure. Without departing from the scope of the present invention, the present invention can use particles having at least two structures and compositions.

The emulsifier used in the present invention is not particularly limited. The present invention can use, for example, a nonionic emulsifier and an anionic emulsifier which are generally used in a conventional emulsion polymerization method. Examples of the nonionic emulsifier include a polyoxyethylene alkyl ether, a polyoxyethylene alcohol ether, a polyoxyethylene alkyl phenyl ether, a polyoxyethylene polycyclic phenyl ether, a polyoxyalkylene alkyl ether, a sorbitan fatty acid ester, a polyoxyethylene fatty acid ester, and a polyoxyethylene sorbitan fatty acid ester. Examples of the anionic emulsifier include an alkylbenzene sulfonate salt, an alkyl sulfuric ester salt, a polyoxyethylene alkyl ether sulfate ester salt, and a fatty acid salt. These may be used alone or in combination of at least two. Representative examples of the anionic emulsifier include sodium dodecyl sulfate, sodium dodecylbenzenesulfonate, and dodecyl sulfate triethanolamine.

The amount of the emulsifier used in the present invention may be an amount generally used in a conventional emulsion polymerization method. Specifically, the amount of the emulsifier is 0.01 to 10% by weight, preferably 0.05 to 5% by weight, more preferably 0.05 to 3% by weight, based on the amount of the charged monomer.

The present invention can use a polymerization initiator generally used in a conventional emulsion polymerization method. Examples of the polymerization initiator include a water-soluble polymerization initiator represented by a persulfate salt, such as potassium persulfate, sodium persulfate, and ammonium persulfate; an oil-soluble polymerization initiator represented by cumene hydroperoxide and diisopropylbenzene hydroperoxide; hydroperoxide; an azo initiator such as 4-4'-azobis(4-cyanovaleric acid), 2-2'-azobis[2-(2-imidazoline 2-yl)propane, 2-2'-azobis(propane-2-carboamidine), 2-2'-azobis[N-(2-carboxyethyl)-2-methylpropanamide, 2-2'-azobis{2-[1-(2-hydroxyethyl)-2-imidazoline 2-yl]propane}, 2-2'-azobis(1-imino-1-pyrrolidino isobutane), and 2-2'-azobis{2-methyl-N-[1,1-bis(hydroxymethyl)-2-hydroxyethyl]propanamide}; and a redox initiator. These polymerization initiators may be used alone or in a combination of at least two.

The amount of the polymerization initiator used in the present invention may be an amount generally used in a conventional emulsion polymerization method. Specifically, the amount of the polymerization initiator is 0.01 to 5% by weight, preferably 0.05 to 3% by weight, more preferably 0.1 to 1% by weight, based on the amount of the charged monomer.

Water used for producing the binder of the present invention is not particularly limited, and the present invention can use water generally used. Examples of water include tap water, distilled water, ion exchange water, and ultrapure water. Among them, distilled water, ion exchange water, and ultrapure water are preferable.

In the present invention, a dispersing agent can be used according to necessity, and a type and a use amount are not particularly limited. Examples of the dispersing agent include sodium hexametaphosphate, sodium tripolyphosphate, sodium pyrophosphate and sodium polyacrylate.

In the present invention, a chain transfer agent can be used according to necessity. Examples of the chain transfer agent include an alkyl mercaptan such as n-hexyl mercaptan, n-octyl mercaptan, t-octyl mercaptan, n-dodecyl mercaptan, t-dodecyl mercaptan and n-stearyl mercaptan; 2,4-diphenyl-4-methyl-1-pentene, 2,4-diphenyl-4-methyl-2-pentene; a xanthogen compound such as dimethylxanthogen disulfide and diisopropylxanthogen disulfide; terpinolene, a thiuram compound such as tetramethyl thiuram disulfide, tetraethyl thiuram disulfide, tetramethyl thiuram monosulfide; a phenol-based compound such as 2,6-di-t-butyl-4-methyl phenol and styrene phenol; an allyl compound such as allyl alcohol, a halogenated hydrocarbon compound such as dichloromethane, dibromomethane, carbon tetrabromide; a vinyl ether such as α-benzyloxy styrene, α-benzyloxy acrylonitrile and α-benzyloxy acrylamide, triphenyl ethane, pentaphenylethane, acrolein, methacrolein, thioglycolic acid, thiomalic acid, and 2-ethylhexyl thioglycolate. The chain transfer agent may be used alone or in a combination of at least two. The amount of the chain transfer agent is not particularly limited, and is typically from 0 to 5 parts by weight, based on 100 parts by weight of the charged monomers.

A polymerization time and a polymerization temperature are not particularly limited. The polymerization time and the polymerization temperature can be suitably selected according to, for example, a type of the used polymerization initiator. Generally, the polymerization temperature is 20° C. to 100° C., and the polymerization time is 0.5 hours to 100 hours.

As to the polymer obtained by the further above-mentioned method, a pH can be adjusted by optionally using a base as a pH adjuster. Examples of the base include an alkali metal (Li, Na, K, Rb, Cs) hydroxide, ammonia, an inorganic ammonium compound, and an organic amine compound. The range of pH is pH of 1 to 11, preferably pH of 2 to 11, more preferably pH of 2 to 10, for example, pH of 3 to 10, particularly pH of 5 to 9.

The binder of the present invention may be generally a binder composition comprising the polymer and water, particularly a binder composition wherein the polymer is dispersed in water. The content (the solid concentration) of the polymer in the binder composition of the present invention is 1% to 80% by weight, preferably 5% to 70% by weight, more preferably 10% to 60% by weight.

A particle diameter of the polymer in the binder of the present invention can be measured by, for example, a dynamic light scattering method, a transmission electron microscope method, and an optical microscopy method. The average particle diameter calculated from the dispersion intensity obtained by using the dynamic light scattering method is 0.001 μm to 1 μm, preferably 0.001 μm to 0.500 μm. Specific examples of a measurement apparatus include Zetasizer Nano manufactured by Spectris.

Method of Preparing the Slurry for Battery Electrode

The method of preparing the slurry for battery electrode comprising the binder of the present invention is not particularly limited. The binder of the present invention, an active material, an electrically conductive additive, water, and optionally a thickening agent may be dispersed by for example, a stirrer, a dispersion machine, a kneading machine, a planetary ball mill, and a homogenizer used usually. The slurry materials may be heated in order to increase the efficiency of dispersion, if the slurry material is not affected.

In order to improve the spreadability of slurry for battery electrodes, a defoaming agent may be beforehand added to the binder composition, or added to the slurry liquid for battery electrode. The addition of the defoaming agent can increase the dispersibility of each component at the time of slurry preparation for battery electrode to improve the spreadability of slurry (a part where blisters remain by coating is a defect), and can suppress the remaining air bubbles in the electrode.

Examples of the defoaming agent include a silicone-based defoaming agent, a mineral oil-based defoaming agent and a polyether-based defoaming agent. The silicone-based defoaming agent and the mineral oil-based defoaming agent are preferable.

The silicone-based defoaming agent includes a dimethyl silicone-based defoaming agent, a methylphenyl silicone-based defoaming agent, and a methylvinyl silicone-based defoaming agent. The dimethyl silicone-based defoaming agent is preferable. The defoaming agent may be used as an emulsion-type defoaming agent dispersed in water together with a surface active agent. The defoaming agent may be used alone or in combination of at least two.

Method of Producing the Electrode for Battery

The method of producing the electrode for battery is not limited, and a general method can be used. For example, a slurry for battery electrode (a coating liquid) comprising a positive electrode active material or a negative electrode active material, an electrically conductive additive, the binder, water, and optionally a thickening agent is coated uniformly onto an electrical collector surface by, for example, a doctor blade method or a silk screen method, to give a suitable thickness of the coating.

For example, in the doctor blade method, a slurry prepared by dispersing a negative electrode active material powder or a positive electrode active material powder, an electrically conductive additive, the binder, etc. in water is coated onto a metal electrode substrate, and is equalized into a suitable uniform thickness by a blade having a predetermined slit width. After the active material is coated, the electrode is dried under conditions of, for example, a 100° C. hot blast or a 80° C. vacuum, in order to remove excessive water and organic solvent. The dried electrode is press-treated by a press apparatus to produce the electrode material. After the press-treatment, the electrode may be heat-treated again to remove water, a solvent, an emulsifier, etc.

The positive electrode material comprises, for example, a metal electrode substrate as a substrate for the electrode material; and a positive electrode active material, and a binder for sending and receiving well the ions to and from an electrolyte layer, and fixing the electrically conductive additive and the positive electrode active material onto the metal electrode substrate. The metal electrode substrate may be, for example, aluminum. The metal electrode substrate is not limited to this, and the metal electrode substrate may be nickel, stainless steel, gold, platinum, titanium, etc.

The positive electrode active material used by the present invention is a lithium metal-containing composite oxide powder which may be at least one composition selected from $LiMO_2$, $LiM_2O_4$, $Li_2MO_3$ and $LiMEO_4$. In the formulas, M mainly comprises transition metals, and contains at least one selected from Co, Mn, Ni, Cr, Fe and Ti. M comprises a transition metal, and may contain at least one of Al, Ga, Ge, Sn, Pb, Sb, Bi, Si, P and B in addition to the transition metal. E contains at least one selected from P and Si. Preferably, a particle diameter of the positive electrode active material is 50 μm or less, more preferably 20 μm or less. These active materials have an electromotive force of at least 3 V (vs. $Li/Li^+$).

Specific examples of the positive electrode active material include lithium cobaltate, lithium nickelate, nickel/manganese/lithium cobaltate (three element systems), spinel-type lithium manganate, and lithium iron phosphate.

The negative electrode material comprises, for example, a metal electrode substrate as a substrate for the electrode material; and a negative electrode active material, and a binder for sending and receiving well the ions to and from an electrolyte layer, and fixing the electrically conductive additive and the negative electrode active material onto the metal electrode substrate. The metal electrode substrate may be, for example, copper. The metal electrode substrate is not limited to this, and the metal electrode substrate may be nickel, stainless steel, gold, platinum, titanium, etc.

Examples of the negative electrode active material used in the present invention include a powder comprising a carbon material (for example, natural graphite, artificial graphite, amorphous carbon) which has a structure (a porous structure) capable of intercalating and deintercalating a lithium ion; or a lithium compound, an aluminum compound, a tin compound, a silicon compound, and a titanium compound comprising a metal capable of intercalating and deintercalating a lithium ion. A particle diameter of the negative electrode active material is preferably from 10 nm to 100 μm, more preferably from 20 nm to 20 μm. A mixture active material between a metal and a carbon material may be used. The negative electrode active material preferably has a porosity of about 70%.

Specific examples of the electrically conductive additive include graphite, and a conductive carbon black, such as furnace black, acetylene black, and ketchen black, and a metal powder. The electrically conductive additive may be used alone or a combination of at least two.

Specific examples of the thickening agent include carboxymethyl cellulose, methyl cellulose, hydroxy methyl cellulose, ethyl cellulose, and a sodium salt, ammonium salt, polyvinyl alcohol and polyacrylate salt thereof. The thickening agent may be used alone or a combination of at least two. The following method of producing the battery is mainly a method of producing a lithium-ion secondary battery.

Method of Producing the Battery

The method of producing the battery, particularly the secondary battery is not particularly limited, and may be a conventionally know method of producing the battery comprises a positive electrode, a negative electrode, a separator, an electrolyte solution and an electrical collector. For example, in the case of a coin-shaped battery, the positive electrode, the separator and the negative electrode are inserted into an external can. The electrolyte solution is charged into the external can, which is impregnated with the electrolyte solution. Then, the external can is bonded to a sealing body by a tab welding to encapsulate the sealing body, and is caulked to obtain the storage battery. The shape of the battery is not limited and examples of the battery shape include a coin shape, a cylinder shape, and a sheet shape. The battery may have a structure wherein at least two batteries are stacked or laminated.

The separator prevents the positive electrode and the negative electrode from directly contacting and short-circuiting within the storage battery, and a conventionally known material can be used for the separator. Specific examples of the separator include a porous polymer film or a paper, such as a polyolefin. The porous polymer film, such as polyethylene and polypropylene is preferable, since this film is not affected with the electrolyte solution.

The electrolyte solution is a solution which comprises a lithium salt compound for electrolyte and an aprotic organic solvent as a solvent. A lithium salt compound, which is generally used for a lithium-ion battery and which has a wide potential window, is used as the lithium salt compound for electrolyte. Examples of the lithium salt compound include $LiBF_4$, $LiPF_6$, $LiClO_4$, $LiCF_3SO_3$, $LiN(CF_3SO_2)_2$, $LiN(C_2F_5SO_2)_2$ and $LiN[CF_3SC(C_2F_5SO_2)_3]_2$, but the lithium salt compound is not limited to these. These may be used alone or in combination of at least two.

Examples of the aprotic organic solvent include propylene carbonate, ethylene carbonate, dimethyl carbonate, diethyl carbonate, methylethyl carbonate, 1,2-dimethoxyethane, 1,2-diethoxy ethane, gamma-butyrolactone, tetrahydrofuran, 1,3-dioxolane, dipropyl carbonate, diethylether, sulfolane, methylsulfolane, acetonitrile, propylnitrile, anisole, an acetate ester, a propionate ester, and a linear ethers such as diethylether, and a combination of at least two may be used.

An ambient-temperature molten salt can be used as the solvent. The ambient-temperature molten salt means a salt, at least part of which exhibits a liquid at an ambient temperature. The ambient temperature means a temperature range assumed that a power source usually operates in said temperature range. The temperature range assumed that a power source usually operates means that the upper limit of the range is about 120° C., optionally about 60° C. and the lower limit is about −40° C., optionally about −20° C.

The ambient-temperature molten salt is also referred to as an ionic liquid, the ambient-temperature molten salt is a "salt" consisting of an ion (an anion and a cation), and, in particular, a liquid compound is referred to as an "ionic liquid".

As a cationic species, known is a tertiary ammonium organic substance cation such as a pyridine-base, a fatty amine-base, and a cycloaliphatic amine-base. Examples of the tertiary ammonium organic substance cation include an imidazolium ion such as dialkyl imidazolium and trialkyl imidazolium, a tetraalkyl ammonium ion, an alkyl pyridinium ion, a pyrazolium ion, a pyrrolidinium ion, and a piperidinium. Particularly, the imidazolium cation is preferable.

Examples of the tetraalkyl ammonium ion include a trimethyl ethylammonium ion, a trimethyl ethylammonium ion, a trimethyl propylammonium ion, a trimethylhexyl ammonium ion, a tetrapentylammonium ion, and a triethyl methylammonium ion. The tetraalkyl ammonium ion is not limited to these.

Examples of the alkyl pyridinium ion include a N-methyl pyridinium ion, a N-ethylpyridinium ion, a N-propylpyridinium ion, a N-butyl pyridinium ion, a 1-ethyl-2 methylpyridinium ion, a 1-butyl-4-methylpyridinium ion, and a 1-butyl-2,4-dimethylpyridinium ion. The alkyl pyridinium ion is not limited to these.

Examples of the imidazolium cation include a 1,3-dimethyl imidazolium ion, a 1-ethyl-3-methyl imidazolium ion, a 1-methyl-3-ethyl imidazolium ion, a 1-methyl-3-butyl imidazolium ion, a 1-butyl-3-methyl imidazolium ion, a 1,2,3-trimethyl imidazolium ion, a 1,2-dimethyl-3-ethyl imidazolium ion, a 1,2-dimethyl-3-propyl imidazolium ion, and a 1-butyl-2,3-dimethyl imidazolium ion. The imidazolium cation is not limited to these.

Examples of an anion species include a halide ion, such as a chloride ion, a bromide ion and an iodide ion, a perchlorate ion, a thiocyanate ion, a tetrafluoroboronate ion, an inorganic acid ion such as a nitrate ion, AsF6- and PF6-, an organic acid ion such as a stearyl sulfonate ion, an octylsulfonate ion, a dodecylbenzenesulfonate ion, a naphthalene sulfonate ion, a dodecylnaphthalene sulfonate ion, and a 7,7,8,8-tetracyano-p-quinodimethane ion.

The ambient-temperature molten salt may be used alone or in combination of at least two.

Various additive agents can be used for an electrolyte solution according to the necessity. Examples of a flame retardant or a nonflammable agent include a halide, such as a brominated epoxy compound, a phosphazene compound, tetrabromobisphenol A and a chlorinated paraffin, antimony trioxide, antimony pentaoxide, aluminum hydroxide, magnesium hydroxide, a phosphate ester, a polyphosphate, and zinc borate. Examples of a negative electrode surface treatment agent include vinylene carbonate, fluoroethylene carbonate, and polyethylene glycol dimethyl ether. Examples of a positive electrode surface treatment agent include an inorganic compound, such as carbon and a metal oxide (for example, MgO and ZrO2), and an organic compound such as o-terphenyl. Examples of an overcharge inhibitor include biphenyl, and 1-(p-tolyl)-adamantane.

EXAMPLES

Examples are explained below by illustrating specific embodiments for carrying out the present invention. However, the present invention is not limited to the following Examples, without departing from the gist of the present invention.

In the following Examples, electrodes and coin batteries were produced by using the binder of the present invention, and, in the following experiments, a bending test and an adhesion test were conducted for evaluations of the electrode, and a charge/discharge cycle characteristics test was conducted for evaluations of the coin battery.

[Evaluation of Produced Electrode]

The bending test and the adhesion test were conducted as evaluation of the produced electrodes. The evaluation results summarized are shown in Table 1.

Bending Test

The bending test was conducted by a mandrel bending test. Specifically, the electrode was cut into a piece having a width of 3 cm and a length of 8 cm, and the state of a paint film of a bending portion was observed when the piece was bent at the longitudinal center (at 4 cm portion) position at an angle of 180 degrees around a support of a stainless steel stick having a diameter of 2 mm into a direction of a substrate (so that an electrode surface is outside). The measurement was conducted 5 times by this method. When no crack or peeling of the electrode surface was formed, the evaluation (flexibility) is "Good", and when one or more cracks or peeling of the electrode surface was formed even at one time, the evaluation is "Bad".

Adhesion Test (Bonding Test)

The adhesion test was done by a cross cut test. Specifically, an electrode was sliced into pieces each having a width of 3 cm and a length of 4 cm, and cuts on the piece are made into a right angled lattice pattern with a cutter knife so as to prepare 25 squares (vertically 5 squares×horizontally 5 squares) each having 1 mm side in the pattern. A tape (CELLOTAPE (registered trademark) manufactured by Nichiban) was stuck on the 25 squares. When the tape was peeled off without pausing under the state that the electrode was fixed, the number of the squares, which remained without separating from the electrode, was measured. The test was carried out 5 times to determine an average value.

[Evaluation of Produced Battery]

The charge/discharge cycle characteristics test was conducted by using a charging-discharging device, whereby evaluating the produced battery to determine a capacity retention rate. The evaluation results summarized are shown in Table 1.

Capacity Retention Rate

Electrochemical characteristics, which is a charge/discharge cycle characteristics of the battery, was evaluated with a charging/discharging device manufactured by Nagano & Co., Ltd. by flowing a constant electric current in the battery, at an upper limit of 4.2V and a lower limit of 2.5V under the test condition (C/8) that, at a first time to a 3rd time, a predetermined electrical charge/discharge in 8 hours can be conducted, and the test conditions (1C) that, at a 4th time or later, a predetermined charge/electric discharge in 1 hour can be conducted. A test temperature was a 60° C. environment. A value of discharge capacity at the 4th cycle was taken as a reversible capacity. The capacity retention rate was evaluated by a ratio of a discharge capacity after conducting the 100 charge/discharge cycles, to a discharge capacity at the 4th cycle.

Synthesis Examples of Binder Composition

Synthesis Example 1 of Binder Composition

Into a reaction vessel equipped with an agitator, 30 parts by weight of (A) polypropylene glycol monoacrylate (BLEMMER AP-400, manufactured by NOF Corp.), 15 parts by weight of (B) vinyl acetate, 1.3 parts by weight of acrylic acid, 3.7 parts by weight of methacrylic acid, 45 parts by weight of methyl methacrylate, 5 parts by weight of (C) trimethylolpropane triacrylate (A-TMPT, manufactured by Shin-Nakamura Chemical Co., Ltd), 1 part by weight of sodium dodecylsulfate as an emulsifier, 500 parts by weight of ion exchanged water, and 1 part by weight of potassium persulfate as a polymerization initiator were charged, emulsified enough by using an ultrasonic homogenizer, and heated for polymerization at 60° C. for 5 hours under a nitrogen atmosphere, then cooled. After cooling the polymerization liquid, a pH of the polymerization liquid was adjusted to 8.1 with a 24% aqueous solution of sodium hydroxide, to obtain Binder composition A (Polymerization conversion of at least 99%, Solid concentration of 17 wt %). The obtained polymer had an average particle diameter of 0.107 micrometers.

Synthesis Example 2 of Binder Composition

Into a reaction vessel equipped with an agitator, 50 parts by weight of (A) polypropylene glycol monoacrylate (BLEMMER AP-400, manufactured by NOF Corp.), 10 parts by weight of (B) vinyl acetate, 1.3 parts by weight of acrylic acid, 3.7 parts by weight of methacrylic acid, 5 parts by weight of (C) pentaerythritol triacrylate (A-TMM-3, manufactured by Shin-Nakamura Chemical Co., Ltd), 1 part by weight of sodium dodecylbenzenesulfonate as an emulsifier, 500 parts by weight of ion exchanged water, and 1 part by weight of potassium persulfate as a polymerization initiator were charged, emulsified enough by using an ultrasonic homogenizer, and heated for polymerization at 60° C. for 5 hours under a nitrogen atmosphere, then cooled. After cooling the polymerization liquid, a pH of the polymerization liquid was adjusted to 8.0 with a 24% aqueous solution of sodium hydroxide, to obtain Binder composition B (Polymerization conversion of at least 99%) (Solid concentration of 16 wt %). The obtained polymer had an average particle diameter of 0.098 micrometers.

Synthesis Example 3 of Binder Composition

Into a reaction vessel equipped with an agitator, 30 parts by weight of (A) polyethylene glycol monoacrylate (BLEMMER AE-400, manufactured by NOF Corp.), 55 parts by weight of (B) vinyl acetate, 2 parts by weight of acrylic acid, 13 parts by weight of (C) trimethylolpropane triacrylate (A-TMPT, manufactured by Shin-Nakamura Chemical Co., Ltd), 1 part by weight of sodium dodecylbenzenesulfonate as an emulsifier, 500 parts by weight of ion exchanged water, and 1 part by weight of potassium persulfate as a polymerization initiator were charged, emulsified enough by using an ultrasonic homogenizer, and heated for polymerization at 60° C. for 5 hours under a nitrogen atmosphere, then cooled. After cooling the polymerization liquid, a pH of the polymerization liquid was adjusted to 8.2 with a 24% aqueous solution of sodium hydroxide, to obtain Binder composition C (Polymerization conversion of at least 99%) (Solid concentration of 16 wt %). The obtained polymer had an average particle diameter of 0.233 micrometers.

Comparative Synthesis Example 1 of Binder Composition

Into a reaction vessel equipped with an agitator, 70 parts by weight of (B) vinyl acetate, 20 parts by weight of acrylic acid, 10 parts by weight of (C) polyethyleneglycol diacrylate, 1 part by weight of sodium dodecylbenzenesulfonate as an emulsifier, 500 parts by weight of ion exchanged water, and 1 part by weight of potassium persulfate as a polymerization initiator were charged, emulsified enough by using an ultrasonic homogenizer, and heated for polymerization at 60° C. for 5 hours under a nitrogen atmosphere, then cooled. After cooling the polymerization liquid, a pH of the polymerization liquid was adjusted to 7.8 with a 24% aqueous solution of sodium hydroxide, to obtain Binder composition D (Polymerization conversion of at least 99%) (Solid concentration of 17 wt %). The obtained polymer had an average particle diameter of 0.098 micrometers.

Comparative Synthesis Example 2 of Binder Composition

Into a reaction vessel equipped with an agitator, 55 parts by weight of (A) polyethylene glycol monoacrylate (BLEMMER AE-400, manufactured by NOF Corp.), 25 parts by weight of (B) vinyl acetate, 20 parts by weight of methacrylic acid, 1 part by weight of sodium dodecylsulfate as an emulsifier, 500 parts by weight of ion exchanged water, and 1 part by weight of potassium persulfate as a polymerization initiator were charged, emulsified enough by using an ultrasonic homogenizer, and heated at 60° C. under a nitrogen atmosphere, then cooled. The polymer did not form fine particles, and the polymer was precipitated in about 1 hour after the stirring was stopped. After cooling the polymerization liquid with stirring, a pH of the polymerization liquid was adjusted to 7.8 with an aqueous solution of sodium hydroxide, to obtain Binder composition E (Polymerization conversion of at least 99%) (Solid concentration of 16 wt %). The obtained polymer had an average particle diameter of 0.098 micrometers.

Comparative Synthesis Example 3 of Binder Composition

Into a reaction vessel equipped with an agitator, 75 parts by weight of (A) propylene glycol monoacrylate (BLEMMER AP-400, manufactured by NOF Corp.), 20 parts by weight of methacrylic acid, 5 parts by weight of (C) polyethyleneglycol diacrylate, 1 part by weight of sodium dodecylsulfate as an emulsifier, 500 parts by weight of ion exchanged water, and 1 part by weight of potassium persulfate as a polymerization initiator were charged, emulsified enough by using an ultrasonic homogenizer, and heated for polymerization at 60° C. for 5 hours under a nitrogen atmosphere, and then cooled. After cooling the polymerization liquid, a pH of the polymerization liquid was adjusted to 7.8 with a 24% aqueous solution of sodium hydroxide, to obtain Binder composition F (Polymerization conversion of at least 99%) (Solid concentration of 18 wt %). The obtained polymer had an average particle diameter of 0.120 micrometers.

Method of Producing the Electrode

Preparation Example 1 for Electrode

To 90.6 parts by weight of nickel/manganese/lithium cobaltate (three-component system) as a positive electrode active material, added were 6.4 parts by weight of acetylene black as an electrically conductive additive, 1 part by weight (solid content) of Binder composition A obtained in Synthesis Example 1 for binder, and 2 parts by weight of sodium salt of carboxymethyl cellulose as a thickening agent, and then water as a solvent was added so that a solid content of a slurry for positive electrode was 35% by weight and sufficiently mixed by a planetary mill to obtain the slurry for positive electrode.

The obtained slurry for positive electrode was applied onto an aluminum current collector having a thickness of 20 micrometer by using a blade coater having a gap of 65 micrometers and then dried under vacuum at 110° C. for at least 12 hours, pressed with a roller press machine to produce a positive electrode having a thickness of 15 micrometers. The evaluation results of flexibility and bindability are shown in Table 1 for Example 1.

Preparation Example 2 for Electrode

A positive electrode was produced as in Preparation Example 1 for electrode except using Binder composition B obtained in Synthesis Example 2 for binder. A thickness of the obtained positive electrode was 16 micrometers. The evaluation results of flexibility and bindability are shown in Table 1 for Example 2.

Preparation Example 3 for Electrode

A positive electrode was produced as in Preparation Example 1 for electrode except using Binder composition C obtained in Synthesis Example 3 for binder. A thickness of the obtained positive electrode was 17 micrometers. The evaluation results of flexibility and bindability are shown in Table 1 for Example 3.

Comparative Preparation Example 1 for Electrode

A positive electrode was produced as in Preparation Example 1 for electrode except using Binder composition D obtained in Comparative Synthesis Example 1 for binder. A thickness of the obtained positive electrode was 15 micrometers. The evaluation results of flexibility and bindability are shown in Table 1 for Comparative Example 1.

Comparative Preparation Example 2 for Electrode

A positive electrode' was produced as in Preparation Example 1 for electrode except using Binder composition E obtained in Comparative Synthesis Example 2 for binder. A thickness of the obtained positive electrode was 15 micrometers. The evaluation results of flexibility and bindability are shown in Table 1 for Comparative Example 2.

Comparative Preparation Example 3 for Electrode

A positive electrode was produced as in Preparation Example 1 for electrode except using Binder composition F obtained in Comparative Synthesis Example 3 for binder. A thickness of the obtained positive electrode was 16 micrometers. The evaluation results of flexibility and bindability are shown in Table 1 for Comparative Example 3.

Comparative Preparation Example 4 for Electrode

To 88.7 parts by weight of nickel/manganese/lithium cobaltate (three-component system) as a positive electrode active material, added were 6.3 parts by weight of acetylene black as an electrically conductive additive, 5 parts by weight of a solid of polyvinylidene fluoride (PVDF, a solution having a solid concentration of 12 wt % in N-methyl-2-pyrrolidone) as a binder, and then N-methyl-2-pyrrolidone as a solvent was added so that a solid content of a slurry for positive electrode was 40% by weight and sufficiently mixed by a planetary mill to obtain the slurry for positive electrode.

A positive electrode was produced as in Preparation Example 1 for electrode except using the thus obtained slurry. A thickness of the obtained positive electrode was 17 micrometers. The evaluation results of flexibility and bindability are shown in Table 1 for Comparative Example 4.

Examples of Producing the Battery

Production Example 1 for Coin Battery (Example 1)

In a glove box substituted with an argon gas, a laminate prepared by bonding the positive electrode obtained in Preparation Example 1 of electrode, two porous films of polypropylene/polyethylene/polypropylene each having a thickness of 18 μm as a separator, and a metal lithium foil having a thickness of 300 μm as a counter electrode was fully impregnated with 1 mol/L solution of lithium hexafluorophosphate in ethylene carbonate and dimethyl carbonate (volume ratio 1:1) as an electrolyte solution, then caulked to produce a 2032 type coin battery for test. Results of determining the capacity retention rate after 100 cycles are shown in Table 1 for Example 1.

Production Example 2 for Coin Battery (Example 2)

The coin battery was produced as in Production Example 1 for coin battery except using the positive electrode obtained in Preparation Example 2 for electrode. Results of determining the capacity retention rate after 100 cycles are shown in Table 1 for Example 2.

Production Example 3 for Coin Battery (Example 3)

The coin battery was produced as in Production Example 1 for coin battery except using the positive electrode obtained in Preparation Example 3 for electrode. Results of determining the capacity retention rate after 100 cycles are shown in Table 1 for Example 3.

Comparative Production Example 1 for Coin Battery (Comparative Example 1)

The coin battery was produced as in Production Example 1 for coin battery except using the positive electrode obtained in Comparative Preparation Example 1 for electrode. Results of determining the capacity retention rate after 100 cycles are shown in Table 1 for Comparative Example 1.

Comparative Production Example 2 for Coin Battery (Comparative Example 2)

The coin battery was produced as in Production Example 1 for coin battery except using the positive electrode obtained in Comparative Preparation Example 2 for electrode. Results of determining the capacity retention rate after 100 cycles are shown in Table 1 for Comparative Example 2.

Comparative Production Example 3 for Coin Battery (Comparative Example 3)

The coin battery was produced as in Production Example 1 for coin battery except using the positive electrode obtained in Comparative Preparation Example 3 for electrode. Results of determining the capacity retention rate after 100 cycles are shown in Table 1 for Comparative Example 3.

Comparative Production Example 4 for Coin Battery (Comparative Example 4)

The coin battery was produced as in Production Example 1 for coin battery except using the positive electrode obtained in Comparative Preparation Example 4 for electrode. Results of determining the capacity retention rate after 100 cycles are shown in Table 1 for Comparative Example 4.

Examples and Comparative Examples are shown in Table 1.

TABLE 1

| | Ex. 1 | Ex. 2 | Ex. 3 | Com. Ex. 1 | Com. Ex. 2 | Com. Ex. 3 | Com. Ex. 4 |
|---|---|---|---|---|---|---|---|
| Binder composition | A | B | C | D | E | F | PVDF |
| Flexibility of electrode | Good | Good | Good | Bad | Bad | Good | Good |
| Bondability of electrode | 25/25 | 25/25 | 25/25 | 12/25 | 10/25 | 15/25 | 7/25 |
| Capacity retention rate after 100 cycles | 96 | 97 | 96 | 70 | 75 | 79 | 80 |

INDUSTRIAL APPLICABILITY

The electrode binder (the binder for secondary lithium battery) of the present invention has the advantages that the binder has high bonding strength, the binder is in a water system giving a small environmental load, and performances are not influenced by a temperature. Accordingly, the secondary lithium-ion battery, comprising the present binder, can be suitably used as a secondary (rechargeable) battery ranging from small-scale batteries, such as electronic devices, e.g., cell phones, laptop computers and camcorders, to large-scale lithium-ion batteries such as storage batteries for house applications for power storage and automotive applications such as electric vehicles and hybrid electric vehicles.

Other embodiments in the present invention are as follows:

[1]
A battery electrode binder comprising a polymer comprising:
(I) structural units derived from a hydroxyl group-containing (meth)acrylate monomer (A), and
(II) structural units derived from a vinyl ester monomer (B) represented by the general formula (1):

[Chemical Formula 11]

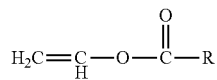
(1)

wherein R is a linear or branched alkyl group having 1 to 18 carbon atoms, and (III) structural units derived from a polyfunctional (meth)acrylate monomer (C).

[2]
The battery electrode binder according to [1], wherein the hydroxyl group-containing (meth)acrylate monomer (A) is an alkylene glycol mono(meth)acrylate having a molecular weight of 100 to 1000.

[3]
The battery electrode binder according to [1] or [2], wherein the polyfunctional (meth)acrylate monomer (C) is di- to penta-functional (meth)acrylates.

[4]
The battery electrode binder according to any one of [1] to [3], wherein a battery is a secondary battery.

[5]
A battery electrode comprising the binder according to any one of [1] to [4], and an active material.

[6]
A battery comprising the battery electrode according to [5].

The invention claimed is:

1. A battery electrode binder comprising a polymer comprising:
   (I) a structural unit derived from a hydroxyl group-containing (meth)acrylate monomer (A),
   (II) a structural unit derived from a vinyl ester monomer (B) represented by the following formula (1):

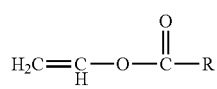
(1)

wherein R is a hydrocarbon group having 1 to 18 carbon atoms, and
   (III) a structural unit derived from a polyfunctional (meth)acrylate monomer (C),
   wherein the amount of the structural unit derived from polyfunctional (meth)acrylate monomer (C) is 5-50 wt %, based on the polymer.

2. The battery electrode binder according to claim 1, wherein the hydroxyl group-containing (meth)acrylate monomer (A) is an alkylene glycol mono(meth)acrylate having a molecular weight of 100 to 1000.

3. The battery electrode binder according to claim 1, wherein the hydroxyl group-containing (meth)acrylate monomer (A) is a compound represented by the formula:

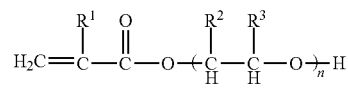

wherein $R^1$ is hydrogen or a linear or branched alkyl group having 1 to 4 carbon atoms, $R^2$ and $R^3$ each is hydrogen or a linear or branched alkyl group having 1 to 4 carbon atoms, and n is an integer of 1-30.

4. The battery electrode binder according to claim 1, wherein the polyfunctional (meth)acrylate monomer (C) is a di- to penta-functional (meth)acrylate.

5. The battery electrode binder according to claim 1, wherein the polyfunctional (meth)acrylate monomer (C) is a compound represented by the formula:

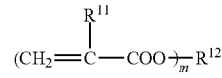

wherein, $R^{11}$ each is, the same or different, hydrogen or a methyl group,
$R^{12}$ is a penta- or less valent organic group having 2 to 100 carbon atoms, and
m is an integer of 5 or less.

6. The battery electrode binder according to claim 1, wherein the polymer further comprises a structural unit derived from at least one acrylic monomer (D) selected from the group consisting of a (meth)acrylic acid monomer and a (meth)acrylate ester monomer.

7. The battery electrode binder according to claim 6, wherein the (meth)acrylic acid monomer is a compound represented by the formula:

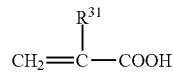

wherein $R^{31}$ is hydrogen or a methyl group, and
the (meth)acrylate ester monomer is a compound represented by the formula:

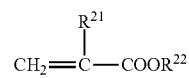

wherein $R^{21}$ is hydrogen or a methyl group, and $R^{22}$ is a hydrocarbon group having 1 to 50 carbon atoms.

8. The battery electrode binder according to claim 6, wherein the amounts of the structural unit derived from the hydroxyl group-containing monomer (A), the structural unit derived from the vinyl ester monomer (B), the structural unit derived from the polyfunctional (meth)acrylate (C), and the structural unit derived from the (meth)acrylic monomer (D) are (A) 10-90 wt %, (B) 5-70 wt %, (C) 5-30 wt % and (D) 1-70 wt %.

9. The battery electrode binder according to claim 1, wherein a battery is a secondary battery.

10. A battery electrode comprising the binder according to claim 1, and an active material.

11. A battery comprising the battery electrode according to claim 10.

12. The battery electrode binder according to claim 1, wherein the amounts of the structural units derived from the hydroxyl group-containing monomers (A), the structural units derived from the vinyl ester monomer (B), and the structural units derived from the polyfunctional (meth)acrylate (C) are (A) 10-90 wt %, (B) 5-70 wt % and (C) 5-30 wt %.

* * * * *